June 8, 1937. J. R. MILLER 2,082,807
BULKHEAD INTERNAL SAFETY RELIEF SALVAGE VALVE
Filed Oct. 29, 1935
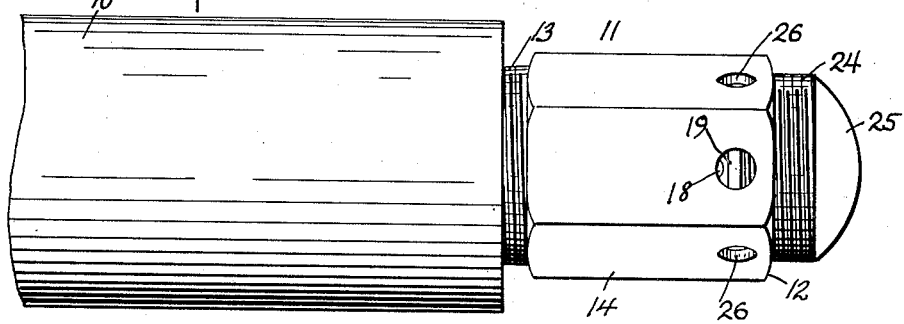
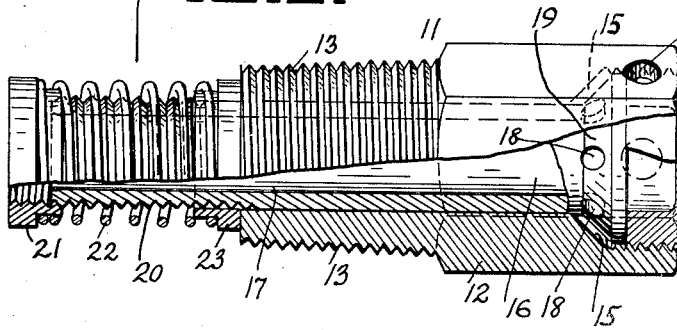 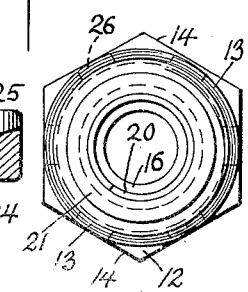
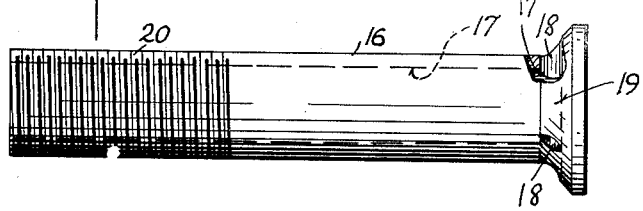 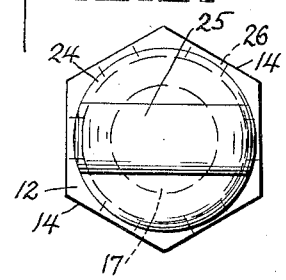
INVENTOR
JOHN RUSSELL MILLER.
BY
Robert A. Lavender
ATTORNEY

UNITED STATES PATENT OFFICE 2,082,807

BULKHEAD INTERNAL SAFETY RELIEF SALVAGE VALVE

John Russell Miller, United States Navy

Application October 29, 1935, Serial No. 47,216

3 Claims. (Cl. 137—53)

(Granted under the act of March 3, 1883, as amended April 30, 1928; 370 O. G. 757)

This invention relates to an internal safety relief salvage valve for bulkheads and tanks, especially on submarines.

An object of this invention is to provide an internal safety relief valve wherein it can be set to operate at any desired pressure within the limits of a spring placed therein and wherein the limits may be changed by substituting a spring of different strength. A further feature of the valve of this invention is that it may be easily locked against operation when conditions are such as to desire such action.

With the above and other objects in view, the invention consists in the construction, combination and arrangement of parts as will be hereinafter more fully described.

In the drawing:

Fig. 1 is a plan view of the valve in this invention as applied at the end of a pressure pipe;

Fig. 2 is a partly elevational and partly sectional view of the assembled valve per se;

Fig. 3 is an end view looking at the left of Fig. 2;

Fig. 4 is an elevational view of the internal valve; and

Fig. 5 is an end view of Fig. 2 looking at the right thereof.

There is shown at 10 a line or conduit carrying pressure therein. It may be desired to limit this pressure to a certain definite amount at certain times and, at other times, it may be desired to close off the line irrespective of the pressure therein.

Threaded into the end of this line 10 is the valve 11 of this invention. This valve 11 includes a hollow valve bonnet 12 having a tapered thread 13 formed at one end thereof for securing it in position in the end of the line or conduit 10 or in a bulkhead or tank wall or other suitable position for use. Beyond the thread 13, the valve bonnet 12 is hexagonal in shape as at 14, so that it may receive a suitable tool or wrench for placing or removing the valve as desired. The valve bonnet 12 is axially bored to receive the internal valve 16 therein. The external diameter of the internal valve 16 is substantially equal to or slightly less than the internal diameter of the bore in the valve bonnet 12, so that the internal valve 16 may slide easily therethrough. The internal valve 16 is hollow as at 17.

The hollow 17 extends through one end and leads to a plurality of holes 18 provided through the internal valve face 19. The other end of the internal valve 16 is threaded as at 20 and is adapted to receive an internally threaded, shouldered nut 21 thereon for adjusting the amount of compression on a coil spring 22, the other end of the coil spring 22 bearing against the shouldered end of the spring guide 23 which slidably fits over the internal valve 16 and abuts against the end of the valve bonnet 12.

The bore in the valve bonnet 12 leads to a bonnet valve seat 15 against which the internal valve face 19 is adjustably held when assembled, as shown in Fig. 2, by the compression spring 22. Beyond the bonnet valve seat 15, the bore, through the bonnet 12, is of a larger diameter and internally threaded as shown to receive a threaded plug 24 having a flattened boss 25 extending beyond its end for adjusting it against the end of the valve 16. The bonnet 12 is provided, through each of its hexagonal sides 14, with an aperture 26 leading to the larger diametered bore adjacent the edge of the bonnet valve seat 15.

In operation the valve 11 is suitably positioned in a bulkhead, tank, or pipe for operation as desired. The spring 22 may be set so as to allow the internal valve to open at any desired pressure by merely adjusting the guide nut 21 along the threads 20 of the internal valve 16, thereby placing the spring under greater or lesser tension and varying the amount of pressure that the valve will hold back before releasing the same. If a greater limit is desired than that within the spring 22, the spring may be removed by disassembling the nut 21 from the end of the internal valve 16 and a suitable spring may be substituted therefor. After having this properly adjusted, the internal valve 16 will remain closed against its seat 15 until the adjusted strength of the spring 22 is exceeded, at which time the valve will open and allow the fluid under pressure to escape through the hollow 17, the holes 18, past the valve seat and out through the apertures 26. At other times it may be desirable to prevent operation of the internal valve irrespective of the amount of pressure that may be brought thereagainst. When such a condition is present, the plug 24 is threaded, by means of the boss or handle 25, until it abuts against the end of the valve 16, locking the valve face 19 against bonnet valve seat 15 and preventing escape of any fluid therethrough.

The invention described herein may be manufactured and used by or for the Government of the United States of America for governmental purposes without the payment of any royalties thereon or therefor.

I claim:

1. An internal relief valve comprising a valve bonnet having a bore extending therethrough, a counterbore at one end of said bore, a valve seat extending between the larger and smaller bores, communicating apertures extending through the bonnet to the larger bore, an internal valve slidably extending through the smaller diametered bore of the valve seat bonnet, said valve having a valve face at one end adapted to cooperate with said bonnet valve seat and adjustable means for yieldably securing said internal valve in closed position, said internal valve having a plurality of apertures extending through the valve face to a common bore extending to the other end of said internal valve, said valve face apertures being located a substantial distance from the outer edge of the valve face, said other end being externally threaded and extending beyond the end of the valve bonnet, said adjustable yieldable securing means being mounted on the threaded end of said valve.

2. An internal relief valve comprising a valve bonnet having a bore extending therethrough, a counterbore at one end of said bore, a valve seat extending between the larger and smaller bores, communicating apertures extending through the bonnet to the larger bore, an internal valve slidably extending through the smaller diametered bore of the valve seat bonnet, said valve having a valve face at one end adapted to cooperate with said bonnet valve seat and adjustable means for yieldably securing said internal valve in closed position, said internal valve having a plurality of apertures extending through the valve face to a common bore extending to the other end of said internal valve, said valve face apertures being located a substantial distance from the outer edge of the valve face, said other end being externally threaded and extending beyond the end of the valve bonnet, said yieldable securing means comprising an adjustable nut threaded on the extended end of said internal valve and a compressible spring about said internal valve between said adjustable nut and the adjacent end of said valve bonnet.

3. An internal relief valve comprising a valve bonnet having a bore extending therethrough, a counterbore at one end of said bore, a valve seat extending between the larger and smaller bores, communicating apertures extending through the bonnet to the larger bore, an internal valve slidably extending through the smaller diametered bore of the valve seat bonnet, said valve having a valve face at one end adapted to cooperate with said bonnet valve seat and adjustable means for yieldably securing said internal valve in closed position, said internal valve having a plurality of apertures extending through the valve face to a common bore extending to the other end of said internal valve, said valve face apertures being located a substantial distance from the outer edge of the valve face, said other end being externally threaded and extending beyond the end of the valve bonnet, said yieldable securing means comprising an adjustable nut threaded on the extended end of said internal valve and a compressible spring about said internal valve between said adjustable nut and the adjacent end of said valve bonnet, a spring guide being interposed between said spring and said bonnet.

JOHN RUSSELL MILLER.